US012135585B2

(12) United States Patent
Karri et al.

(10) Patent No.: US 12,135,585 B2
(45) Date of Patent: Nov. 5, 2024

(54) AUTOMATIC ALIGNMENT OF WRIST-MOUNTED DISPLAY WITH ANOTHER DISPLAY DEVICE

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Saraswathi Sailaja Perumalla, Visakhapatnam (IN); Sirisha Akella, Seethammadhara (IN)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 17/487,287

(22) Filed: Sep. 28, 2021

(65) Prior Publication Data

US 2023/0099404 A1    Mar. 30, 2023

(51) Int. Cl.
*G06F 1/16* (2006.01)
*F16M 11/08* (2006.01)
(Continued)

(52) U.S. Cl.
CPC ............. *G06F 1/163* (2013.01); *F16M 11/08* (2013.01); *F16M 11/18* (2013.01); *G04G 9/007* (2013.01);
(Continued)

(58) Field of Classification Search
CPC ....... G09G 2340/0492; G09G 2356/00; G09G 2360/04; G09G 2370/04; G09G 2380/02;
(Continued)

(56) References Cited

U.S. PATENT DOCUMENTS 9,239,648 B2    1/2016  Smus
10,152,028 B2   12/2018 Kim
(Continued)

FOREIGN PATENT DOCUMENTS

WO    2016138728 A1    9/2016

OTHER PUBLICATIONS

Patnaikuni, et al., "Magnetically Orbiting User-Worn Device", U.S. Appl. No. 16/815,337, filed Mar. 11, 2020, 50 pgs.

*Primary Examiner* — Amr A Awad
*Assistant Examiner* — Aaron Midkiff
(74) *Attorney, Agent, or Firm* — CHIP LAW GROUP

(57) ABSTRACT

Disclosed are techniques for automatically aligning a wrist-mounted display device to a primary display device to facilitate simultaneous use of both display devices. Historical usage information corresponding to a user using both devices is leveraged to determine usage patterns for the devices together. Subsequently, when the primary display device is used by the user, the usage patterns are used to determine when the wrist-mounted display device can be used together with the primary display device. Position information from each device is used to determine a position for the wrist-mounted display device to automatically relocate to for aligning the wrist-mounted display device and the primary display device to have similar viewing directions. The wrist-mounted display device is automatically aligned to the position, and a usage of the aligned wrist-mounted display device is initiated based on the historical usage patterns.

15 Claims, 6 Drawing Sheets

(51) Int. Cl.
*F16M 11/18* (2006.01)
*G04G 9/00* (2006.01)
*G04G 17/04* (2006.01)
*G04G 21/02* (2010.01)
*G09G 3/00* (2006.01)
*G06N 20/00* (2019.01)

(52) U.S. Cl.
CPC ............ *G04G 17/045* (2013.01); *G04G 21/02* (2013.01); *G06F 1/1652* (2013.01); *G09G 3/035* (2020.08); *G06F 2200/1637* (2013.01); *G06N 20/00* (2019.01); *G09G 2340/0492* (2013.01); *G09G 2356/00* (2013.01); *G09G 2360/04* (2013.01); *G09G 2370/04* (2013.01); *G09G 2380/02* (2013.01)

(58) Field of Classification Search
CPC ....... G09G 3/035; G06F 1/163; G06F 1/1652; G06F 2200/1637; G06F 1/1637; G06F 1/1647; G06F 1/1694; G06F 3/1423; G06F 1/1615; G06F 1/1624; G06F 3/0346; G06F 3/0412; G06N 20/00–20; F16M 11/08; F16M 11/18; F16M 11/04–14; F16M 13/04; F16M 11/10; F16M 11/00–425; G04G 9/007; G04G 17/045; G04G 17/08; G04G 21/02; G04G 9/0064; G04B 37/1426; G04B 37/1486; H02N 15/00
USPC ......................................................... 715/761
See application file for complete search history.

(56) References Cited

U.S. PATENT DOCUMENTS

| | | | |
|---|---|---|---|
| 2015/0309535 A1* | 10/2015 | Connor ................ | A61B 5/1477 361/679.03 |
| 2016/0062319 A1* | 3/2016 | Kim ...................... | G04C 10/00 368/204 |
| 2016/0098091 A1* | 4/2016 | Hwang ................ | G06F 21/606 715/761 |
| 2016/0357158 A1* | 12/2016 | Kim ...................... | G04G 21/06 |
| 2017/0155282 A1* | 6/2017 | Jeong .................... | H02J 50/10 |
| 2019/0220166 A1* | 7/2019 | Nagaraju ............... | G06F 3/016 |
| 2021/0018879 A1* | 1/2021 | Li .......................... | G04G 9/00 |
| 2021/0022258 A1* | 1/2021 | Yu ......................... | H01F 7/06 |
| 2021/0096733 A1 | 4/2021 | Greenebaum | |

* cited by examiner

AUTOMATIC ALIGNMENT OF WRIST-MOUNTED DISPLAY WITH ANOTHER DISPLAY DEVICE

BACKGROUND

The present invention relates generally to the field of wrist-mounted display devices, and more particularly to automatic manipulation of a wrist-mounted display along a magnetic path to facilitate simultaneous usage with another display.

A smartphone is a portable device that combines mobile telephone and computing functions into a single device. Smartphones are distinguished from feature phones by their more powerful hardware capabilities and extensive mobile operating systems, which enable wider software, internet (including web browsing over mobile broadband), and multimedia functionality (including music, video, cameras, and gaming), in addition to core phone operations such as voice calls and text messaging. Smartphones often include a number of metal-oxide-semiconductor (MOS) integrated circuit (IC) chips, various sensors that can be utilized by pre-included and third-party software (such as a magnetometer, proximity sensors, barometer, gyroscope, accelerometer and more), and support wireless communications protocols (such as Bluetooth, Wi-Fi, or satellite navigation, such as GPS).

A smartwatch is a wearable computer in the form factor of a watch; state of the art smartwatches provide a local touchscreen interface, while an associated smartphone application (or app) provides for management and telemetry (for example, long-term biomonitoring). While early smartwatches could perform basic tasks, such as calculations, digital time telling, language translations, and playing computer games, later smartwatches have more general functionality more similar to smartphones, including mobile apps, a mobile operating system and WiFi/Bluetooth connectivity. Some smartwatches can serve as portable media players, with FM radio and playback of digital audio and video files via a Bluetooth (or other wireless communication standard) headset. Some smartwatches, called watch phones (or vice versa), have built-in mobile cellular functionality for making calls independent of a wireless connection to a smartphone device.

While internal hardware varies, typically smartwatches include an electronic visual display, either backlit LCD or OLED. Some models use transflective or electronic paper, which consumes relatively less power. They frequently powered by a rechargeable lithium-ion battery. Peripheral components of a smartwatch may include digital cameras, thermometers, accelerometers, pedometers, heart rate monitors, altimeters, barometers, compasses, GPS receivers, audio speakers, and microSD cards, which are recognized as storage devices by many other kinds of computers. Some software applications that are known to be deployed on smartwatches include digital maps, schedulers and personal organizers, calculators, and various kinds of watch faces. Smartwatches are capable of communicating with external devices such as sensors, wireless headsets, or a heads-up display. Similar to other types of computers, a smartwatch may collect information from internal or external sensors and may control, or retrieve data from, other instruments or computer devices. Smartwatches may support various wireless technologies such as Bluetooth, Wi-Fi, and GPS. For many purposes, a "watch computer" or smartwatch operates as a front end for a remote system such as a smartphone, communicating with the smartphone using various wireless technologies to tap into the additional capabilities of the smartphone.

An electric motor is a type of machine that transforms electrical energy into mechanical energy. Most typical electric motors operate through the interaction between a magnetic field in the motor and an electric current in a wire winding to generate force in the form of torque applied on the motor's shaft.

SUMMARY

According to an aspect of the present invention, there is a method, computer program product and/or system for use with a wrist-mounted display device having a display component connected to a wrist-strap that performs the following operations (not necessarily in the following order): (i) receiving an orientation-usage information dataset indicative of recent user interactions with a first display device and orientation of the first display device relative to the wrist-mounted display device; (ii) determining that the wrist-mounted display device should display content corresponding to the recent user interactions with the first display device based, at least in part, on the recent user interactions with the first display device; and (iii) repositioning the display component of the wrist-mounted display device from a first position along the wrist-strap to a second position along the wrist-strap based, at least in part, on the orientation of the first display device relative to the wrist-mounted display device.

DETAILED DESCRIPTION

Figure 1:
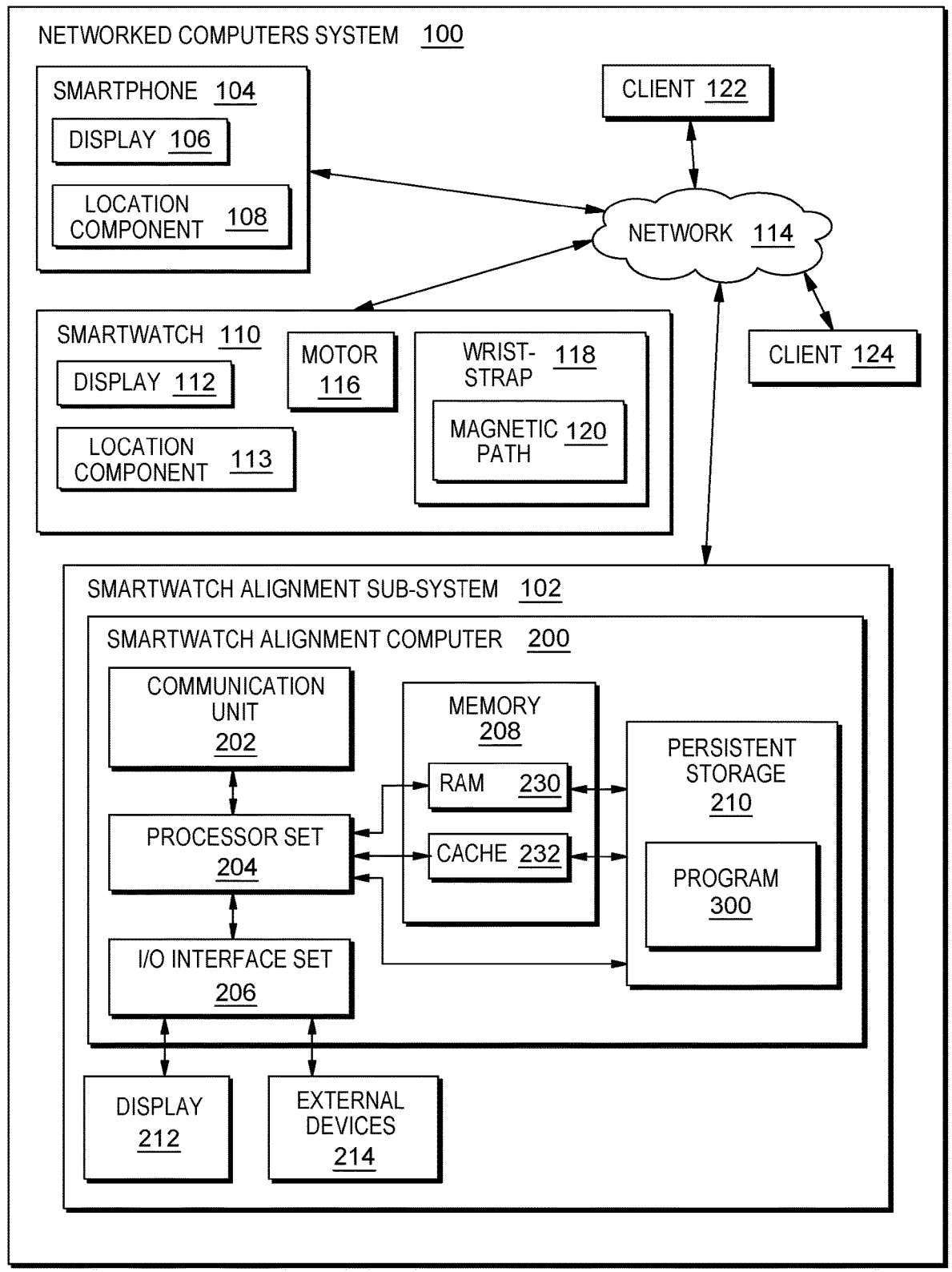
FIG. 1 is a block diagram view of a first embodiment of a system according to the present invention.

Some embodiments of the present invention are directed to techniques for automatically aligning a wrist-mounted display device to a primary display device to facilitate simultaneous use of both display devices. Historical usage information corresponding to a user using both devices is leveraged to determine usage patterns for the devices together. Subsequently, when the primary display device is used by the user, the usage patterns are used to determine when the wrist-mounted display device can be used together with the primary display device. Position information from each device is used to determine a position for the wrist-mounted display device to automatically relocate to for aligning the wrist-mounted display device and the primary display device to have similar viewing directions. The wrist-mounted display device is automatically aligned to the position, and a usage of the aligned wrist-mounted display device is initiated based on the historical usage patterns.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium, sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable cable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: smartwatch alignment subsystem 102 (sometimes herein referred to, more simply, as subsystem 102); smartphone 104; smartwatch 110; client subsystems 122, 124; and communication network 114. Server subsystem 102 includes: smartwatch alignment computer 200; communication unit 202; processor set 204; input/output (I/O) interface set 206; memory 208; persistent storage 210; display 212; external device(s) 214; random access memory (RAM) 230; cache 232; and program 300. Smartphone 104 includes: display 106; and location component 108. Smartwatch 110 includes: display 112; location component 114; motor 116; and wrist-strap 118. Wrist-strap 118 includes magnetic path 120.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

Smartphone 104 is a smartphone device with a touch-screen display screen, shown as display 106. Smartphone 104 also includes location component 108, which includes a variety of sensors for determining the position, orientation, and movement of smartphone 104, such as: one or more proximity sensors, one or more gyroscopes, one or more magnetic field sensors, and/or one or more accelerometers. Smartphone 104 also includes computing and communication components required for performing the common functions of a smartphone, not shown, such as: computer processors, memory, Bluetooth communication components, wi-fi communication components, etc.

Smartwatch 110 is a smartwatch device with a touch-screen display, shown as display 112, located on the face "or dial" of smartwatch 110. Smartwatch 110 also includes location component 108, which includes a variety of sensors for determining the position, orientation, and movement of smartwatch 110, such as: one or more proximity sensors, one or more gyroscopes, one or more magnetic field sensors, and/or one or more accelerometers. Additionally, smartwatch 110 includes motor 116 and wrist-strap 118; motor 116 is an electronic motor for moving display 112 along magnetic path 120 of wrist-strap 118. Magnetic path 120 holds display 112 in physical contact with watch-strap 118 while allowing display 112 to move along the length of watch-strap 118.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
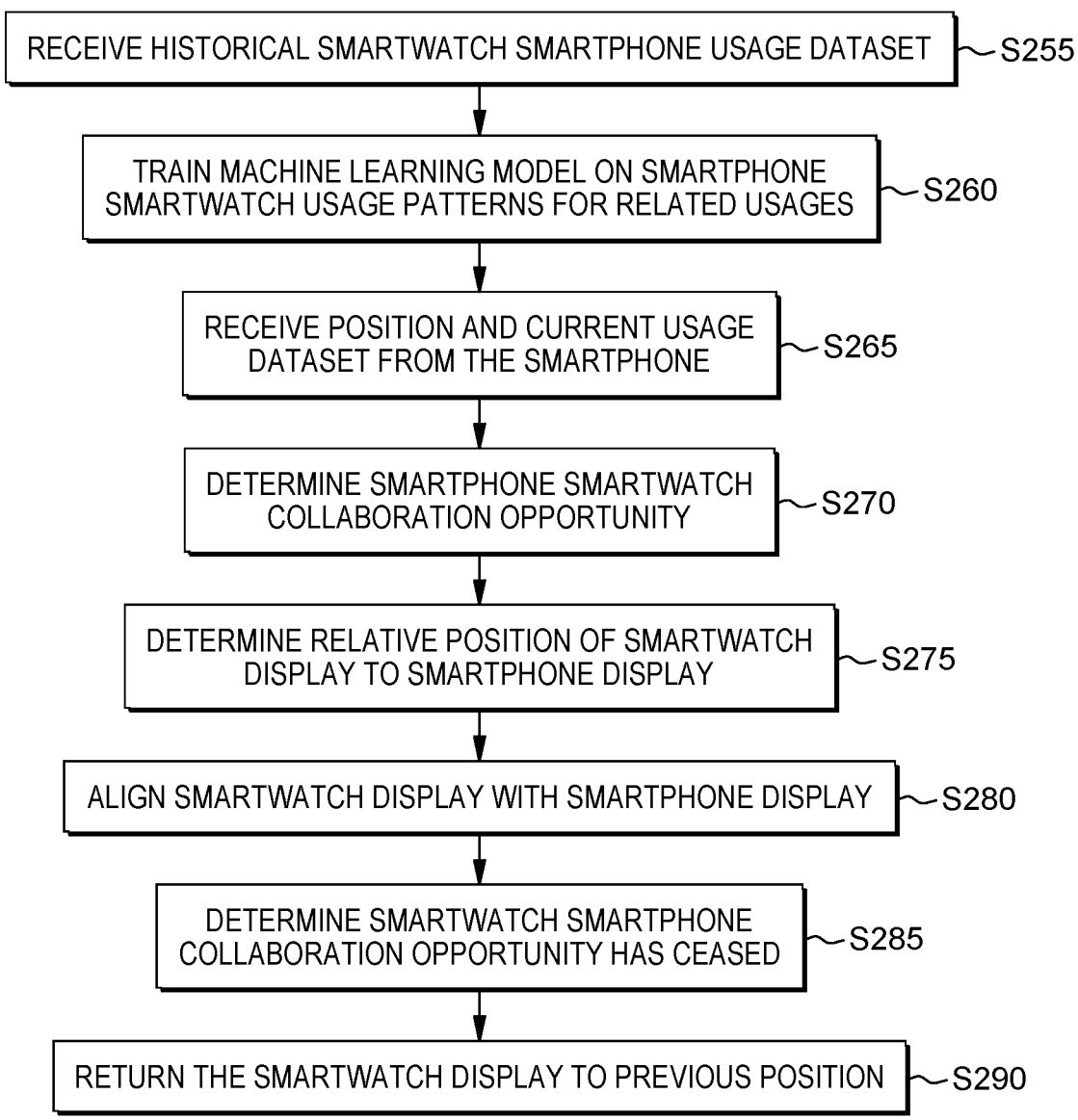
FIG. 2 is a flowchart showing a first embodiment method performed, at least in part, by the first embodiment system.
Figure 3:
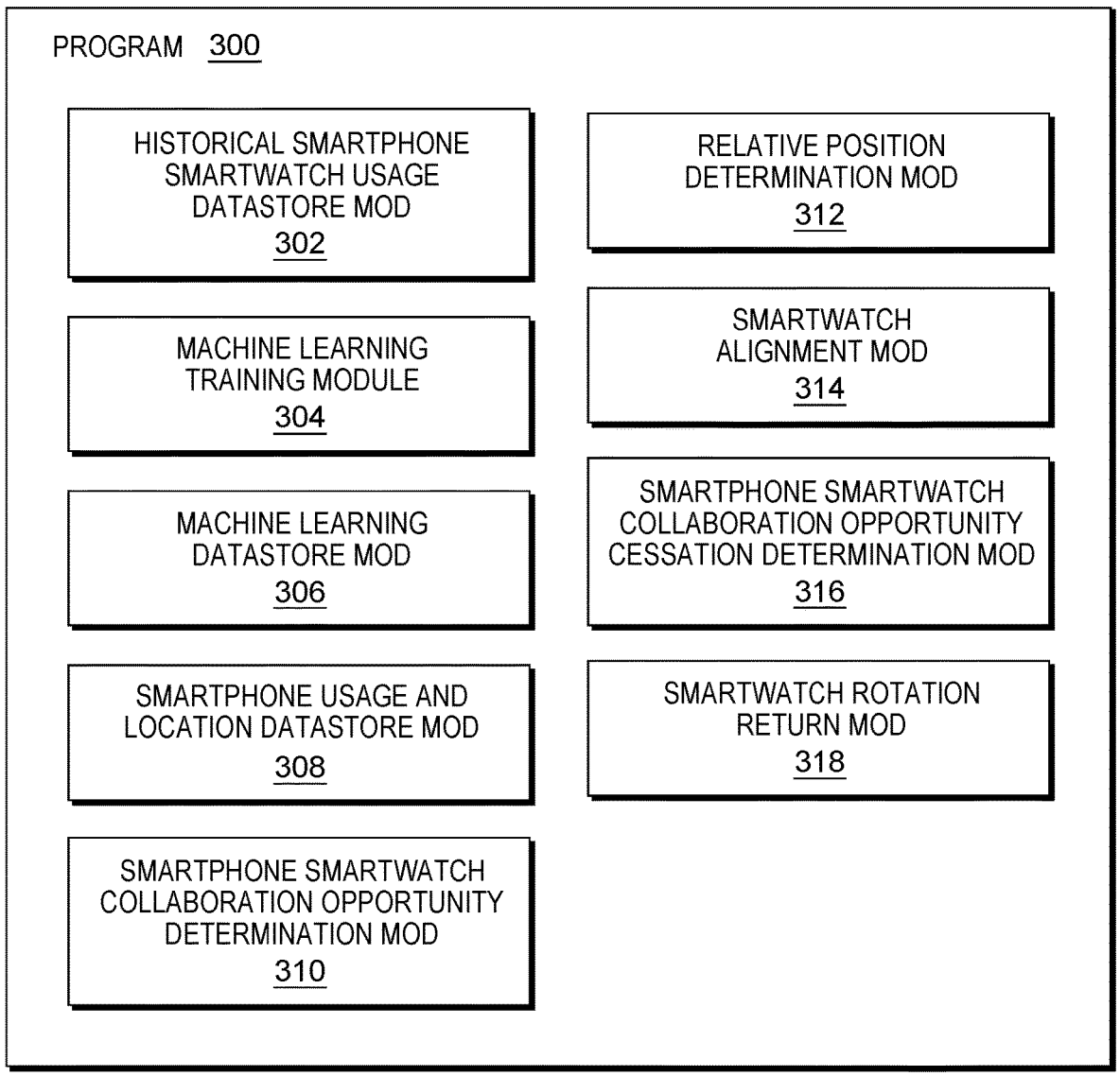
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where historical smartphone smartwatch usage datastore module ("mod") 302 receives a historical smartwatch smartphone usage dataset. In this simplified embodiment, the historical smartwatch smartphone usage dataset includes a plurality of records for smartphone 104 of FIG. 1 and smartwatch 110, detailing when both smartphone 104 and smartwatch 110 were used by user John Smith within one minute of each other, as well was what interactions user John Smith had with either device, including which app John Smith was using on which device and what input John Smith provided to the device. In some records, a video conferencing app called "web meetings" have John Smith using smartwatch 110 to view video feeds from other meeting participants while smartphone 104 is showing a computer screen or document shared by one meeting participant for viewing by other meeting participants.

In the user interface of web meetings, when one participant shares a computer screen or document with other meeting participants, those other meeting participants screens, if participating in the meeting through a smartphone or other smaller form-factor computer device, are fully occupied by the shared document or computer screen; any video feeds showing the other meeting participants are hidden while the document or computer screen is shared. When web meetings is used on a larger form-factor computer device (with a larger display), or a smartphone connected to additional displays, the video feeds of the other meeting participants are diverted to other displays (or to another portion of the larger display) while the shared screen or document occupies the primary display (or largest portion of the larger display).

Processing proceeds to operation S260, where machine learning training module 304 trains a machine learning model on smartphone smartwatch usage patterns for related usages. In this simplified embodiment, the machine learning model is trained using the historical smartwatch smartphone usage dataset stored in historical smartphone smartwatch usage datastore mod 302, with the machine learning model stored in machine learning datastore mod 306. The machine learning model is trained to determine what usage patterns of smartphone 104 correspond to usage of smartwatch 110, and what the corresponding usage of smartwatch 110 is. Based on the historical smartwatch smartphone usage dataset stored in historical smartphone smartwatch usage datastore mod 302, the machine learning model recognizes that John Smith has historically used smartwatch 110 to view other meeting participants in web meetings when using web meetings on smartphone 104 and another participant shares a computer screen or document to other meeting participants. In some alternative embodiments, the machine learning model is also trained to recognize when a smartwatch usage pattern corresponds to usage that is more often associated with a larger display area than a typical smartwatch display (for example, viewing a video, reading a document, browsing a webpage).

Processing proceeds to operation S265, where smartphone usage and location datastore mod 308 receives a position and current usage dataset from the smartphone. In this simplified embodiment, the position and current usage dataset is a live, continuous feed received from smartphone 104 of FIG. 1 that continuously provides the current position and usage of smartphone 104, including the following information: (i) the direction display 106 is facing, determined by location component 108; and (ii) John Smith is currently using web meetings on smartphone 104, and a presentation slide is uploading to the meeting from Jane Doe.

Processing proceeds to operation S270, where smartphone smartwatch collaboration opportunity determination mod 310 determines a smartphone smartwatch collaboration opportunity. In this simplified embodiment, smartphone smartwatch collaboration opportunity determination mod 310 determines a smartphone smartwatch collaboration opportunity based on the smartphone usage and location dataset stored in smartphone usage and location datastore mod 308. First, smartphone smartwatch collaboration opportunity determination mod 310 determines that smartphone 104 of FIG. 1 and smartwatch 110 are within proximity to each other through proximity sensors of location component 108 and location component 113. In this simplified embodiment, smartphone 104 and smartwatch 110 must be within twelve inches of each other for a collaboration opportunity to be present. In this simplified embodiment, smartphone 104 and smartwatch 110 are eight inches apart. Next, to determine a collaboration opportunity, smartwatch smartphone collaboration opportunity determination mod 310 applies the trained machine learning model to the smartphone usage data in the smartphone and location dataset stored in smartphone usage and location datastore mod 308. In this embodiment, John Smith's usage of web meetings on smartphone 104, with Jane Doe uploading a presentation slide to the meeting, corresponds to a collaboration opportunity recognized by the trained machine learning model.

Processing proceeds to operation S275, where relative position determination mod 312 determines a relative position of smartwatch display to smartphone display. In this simplified embodiment, the relative position of smartwatch display to smartphone display corresponds to the relative positions (and viewing directions) of smartphone display 106 of FIG. 1 and smartwatch display 112. As part of determining the relative position of smartphone display 106 and smartwatch display 112, a position on magnetic path 120 of wrist-strap 118, is determined corresponding to an alignment of viewing direction of smartwatch display 112 to smartphone display 106. In this simplified embodiment, the alignment of viewing direction of smartwatch display 112 to smartphone display 106 corresponds to the position along magnetic path 120 associated with the closest possible viewing direction of smartwatch display 112 (an angle corresponding to a straight line directly away from the surface of smartwatch display 112) to the viewing direction of smartphone display 106 (an angle corresponding to a straight line directly away from the surface of smartphone display 106), as it is possible that smartwatch display 112 cannot be repositioned by motor 116 along magnetic path 120 such that the viewing direction of smartwatch display 112 and the viewing direction of smartphone display 106 are not identical. In this simplified embodiment, a predetermined number of positions are recorded along the circumference of magnetic path 120, with one every millimeter, and each position is associated with a viewing direction of smartwatch display 112.

Figure 4A:
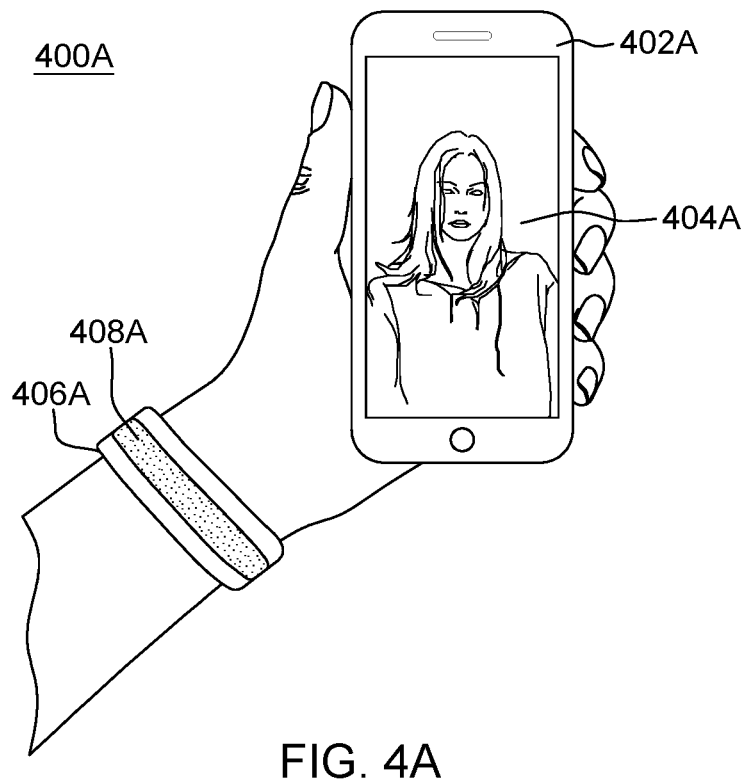
FIG. 4A is a screenshot view generated by the first embodiment system.

In this embodiment, smartwatch display 112 is currently positioned at position 0 on magnetic path 120 (with position 0 as the default starting position of smartwatch display 112), and the position along magnetic path 120 associated with the closest possible viewing direction of smartwatch display 112 to the viewing direction of smartphone display 106 is position 180, located directly on the opposite side of magnetic path 120. Shown in screenshot 400A of FIG. 4A, smartwatch display 112, located at position 0 of magnetic path 120, corresponds to the dorsal side of John Smith's left wrist (with the wrist concealing smartwatch display 112), where wrist-strap 118 is shown as 406A and magnetic path 120 is shown as 408A. Also shown is smartphone 104, numbered as 402A in FIG. 4A, with Jane Doe's personal video feed in the web meeting shown on smartphone display 404A.

Figure 4B:
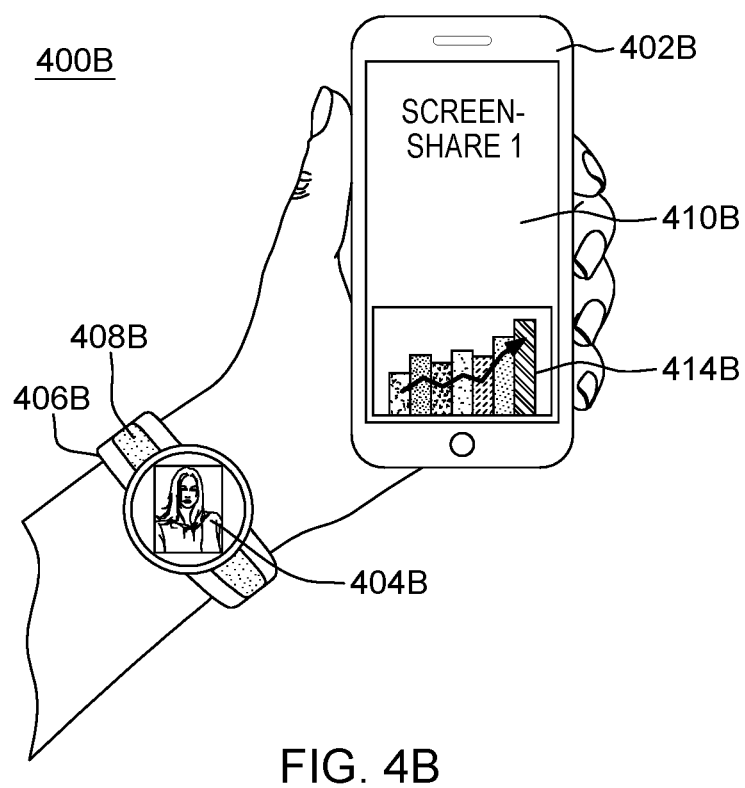
FIG. 4B is a screenshot view generated by the first embodiment system.

Processing proceeds to operation S280, where smartwatch alignment mod 314 aligns the smartwatch display with the smartphone display. In this simplified embodiment, smartwatch alignment rotation mod 314 rotates smartwatch display 112 of FIG. 1 to position 180 along magnetic path 120 for alignment with the viewing direction of smartphone display 106 by instructing smartwatch 110 to engage motor 116. Motor 116, an electronic motor, moves smartwatch display 112 along magnetic path 120 to the designated location, position 180. This is shown in screenshot 400B of FIG. 4B, where smartwatch display 412 corresponds to smartwatch display 112, wrist-strap 406B corresponds to wrist-strap 118, and magnetic path 408B corresponds to magnetic path 120. The viewing direction of smartwatch display 412B (smartwatch display 112) is now aligned with the viewing direction of smartphone display 410B (corresponding to smartphone display 106) of smartphone 402B (corresponding to smartphone 104).

Next, smartwatch alignment mod 314 leverages the trained machine learning model to determine what the corresponding usage of smartwatch 110 is in this scenario and to instructs smartwatch display 112 to display the corresponding usage of smartwatch 110. In this simplified embodiment, based on Jane Doe uploading a presentation slide to be shared to the web meeting, the corresponding usage determined by the trained machine learning model is displaying the personal video feeds of the meeting participants. Smartwatch alignment mod 314 instructs smartwatch 110 to display the web meeting personal video feed of Jane Doe on smartwatch display 112, shown as Jane Doe video feed 404B in FIG. 4B, while the presentation slide uploaded by Jane Doe is shown on smartphone display 106, shown in presentation slide 414B on smartphone display 410B in FIG. 4B.

Processing proceeds to operation S285, where smartphone smartwatch collaboration opportunity cessation determination mod 316 determines the smartphone smartwatch collaboration opportunity has ceased. In this simplified embodiment, smartphone smartwatch collaboration opportunity cessation determination mod 316 determines the smartphone smartwatch collaboration opportunity has ceased based on applying the trained machine learning model to the usage feed of smartphone 104 in smartphone usage and location datastore mod 308, which received usage information corresponding to the web meeting terminating. In some alternative embodiments, if location component 113 of smartwatch 110 or location component 108 of smartphone 104 determines that there is too much distance between them (or if power is lost to smartwatch 110), the collaboration opportunity is determined to have ceased. In yet further embodiments, upon aligning smartwatch display 112 with smartphone display 106, a notification is displayed on smartwatch display 112 querying whether the user (John Smith) desires alignment between smartwatch display 112 and smartphone display 106. The user may input a command to cancel the alignment (such as by pressing a touch screen button on smartwatch display 112), resulting in smartwatch display 112 returning to its previous position. In some alternative embodiments, when the user inputs a cancel command to cancel the alignment, the trained machine learning model is updated based on this user input, refining how the machine learning algorithm determines future collaboration opportunities according to the user (John Smith).

Processing proceeds to operation S290, where smartwatch rotation return mod 318 returns the smartwatch display to the previous position. In this simplified embodiment, smartwatch rotation return mod 318 returns smartwatch display 112 of FIG. 1 to the previous position, position 0, along magnetic path 120 by instructing smartwatch 110 to engage motor 116. Motor 116 moves smartwatch display 112 along magnetic path 120 to the designated location, position 0. Smartwatch display 112 is magnetically attached to magnetic path 120 of wrist-strap 118, allowing smartwatch display 112 to move along magnetic path 120 while still remaining in close physical contact with magnetic path 120 and wrist-strap 118.

In some alternative embodiments, when a collaboration opportunity is determined, a determination is made as to how much additional display space (or an amount of area of electronic display) is required, based on how much display space is available to a rollable-type of display that can expand and contract to various sizes. The determined collaboration opportunity may call for display sizes in measurements (such as by specified dimensions in numbers of pixels, distance measurements such as millimeters or inches, etc.), subjective descriptions (such as small, medium, large, maximum, etc.) corresponding to how much of a rollable display should be extended, or percentages of available rollable display. Where a smartwatch display comprises a split display with a rollable display component, and the split display comprises two halves of a display that may separate to reveal some or all of the rollable display, the collaboration opportunity determination includes whether any of the rollable display is required or if the split display (unseparated) is sufficient for the collaboration opportunity. If the collaboration opportunity determination specifies that some or all of the rollable display is required, smartwatch alignment rotation mod 314 also separates the split display and reveals the required portions of the rollable display. In yet further alternative embodiments, smartphone 104 is instead another type of computer device with a display, such as a tablet computer, laptop computer, a "smart" television, or a head-mounted display (such as smart glasses with an augmented reality display).

III. Further Comments and/or Embodiments

Some embodiments of the present invention recognize the following facts, potential problems and/or potential areas for improvement with respect to the current state of the art: (i) a method and system by which, if a user wears smartwatch with loosely fitted on the wrist, then based on contextual need, the display area of the smart watch will use the wrist belt as a rail for the display area and will be self-moving on the wrist belt rail to align with the user's facial direction; (ii) FIGS. 5A and 5B, described in further detail below, illustrate a smartwatch belt structure with magnetic path enabling the smartwatch belt to guide the movement path of the smartwatch display area; (iii) such a smart watch can predict when the display area needs to be moved (such as by orientation of the wrist, determined through gyroscopes and accelerometers, or other such movement detection components); (iv) accordingly the smartwatch display area will self-move on the guided path of the wrist belt, aligning the display area towards a target direction; (v) in many situations, the user may desire to use a smartwatch (or other wrist-mounted/wrist-worn device with a display) and mobile [handheld] device together; (vi) for example, the additional display area of a smartwatch can help the user with better navigation of mobile device content; (vii) continuing the example, opened apps in the background of the mobile device will be shown on the smartwatch display; (viii) if the user wants to switch which app they are using, the user can simply select the smartwatch display without disturbing the mobile display interface; (ix) when a user wants to perform interaction with multiple devices, like a mobile device and smartwatch together, then the display area of mobile device and smartwatch should be aligned with each other in a proper fashion, so that user can look at both the displays together in the same viewing angle; and (xi) commonly, the user has to manually adjust the smartwatch display area to align with their mobile handheld device (such as rotating the face of the smart watch to be positioned on the inside, or volar side, of the wrist as opposed to the outside, or dorsal side, of the wrist).

Figure 5A:
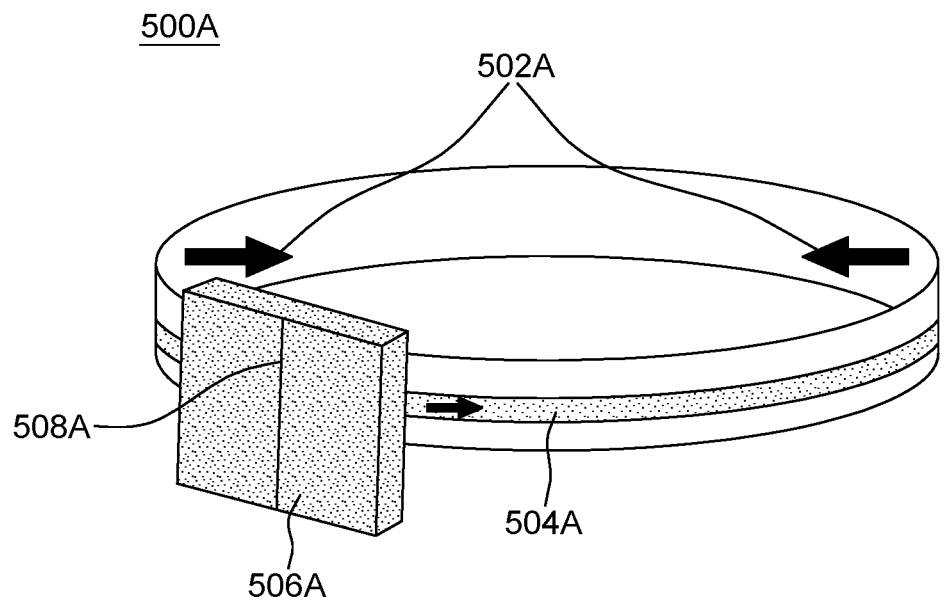
FIG. 5A is a block diagram view showing a smartwatch featuring a magnetic path along a wristband for the body of the smartwatch to move along.

FIG. 5A illustrates a smartwatch device, typically worn on a wrist, including the following elements: (i) smartwatch 500A; (ii) smartwatch belt 502A; (iii) magnetic path 504A; (iv) display area 506A; and (v) screen split 508A. Smartwatch belt 502A is ready to be tightened. Display area 506A moves along magnetic path 504A. Display area 506A can split along screen split 508A (shown in FIG. 5B). When smartwatch 500A detects the user needs to look at the smartwatch display, when smartwatch belt 502A is loose the position of display area 506A may be displaced and inconvenient to view by the user.

Figure 5B:
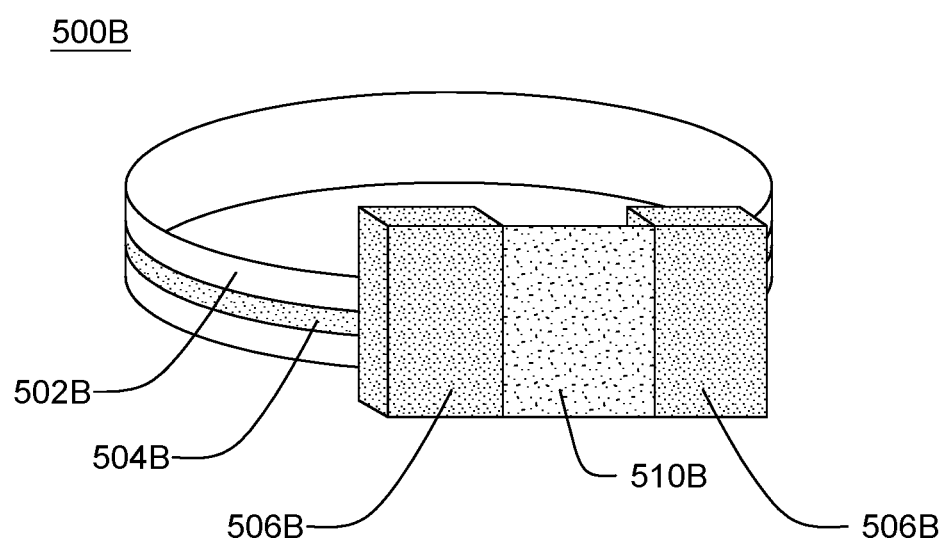
FIG. 5B is a block diagram view showing a smartwatch featuring a magnetic path along a wristband for the body of the smartwatch to move along.

FIG. 5B further illustrates the smartwatch device, shown in FIG. 5A, which has split along screen split 508A, now shown with display area 506A of FIG. 5A split into display areas 506B, along with rollable display portion 510B exposed. Smartwatch belt 502B is now tightened. With display areas 506B splitting to show rollable display portion 510B, rollable display portion 510B has expanded the total viewable display area of smartwatch 500B, and the display areas, including display areas 506B and rollable display portion 510B, electronically move along magnetic path 504B to be positioned where the user wearing smartwatch 500B can view them [without rotating or otherwise repositioning their arm that is wearing smartwatch 500B].

Some embodiments of the present invention may include one, or more, of the following operations, features, characteristics and/or advantages: (i) a technique by which, based on collaborative interaction need between smartwatch and mobile device, common content displayed on smartwatches or on respective apps on mobile devices is placed closer so that they can recognize or sync; (ii) the smartwatch display will be auto aligned with respect to the mobile device display area so that a user's collaborative interaction between smartwatch and mobile device will be more effective; (iii) based on historical collaborative interaction pattern between smartwatch and mobile device, (a primary and secondary device), predict if the user will be interacting with both mobile device and smartwatch together; (iv) accordingly smartwatch display will dynamically be auto aligned with respect to the mobile device display alignment; (v) below is a scenario with regard to Primary and secondary devices in collaborative, contextual usage; (vi) a user is using their tablet that is placed on working desk and smart watch is secondary device connected with content on the tablet; (vii) the user viewing direction of the tablet and smart watch need not be at same angle in this scenario; (viii) while using the tablet, their hand position might keep changing based on position of the tablet angle; (ix) the connected device display direction (the tablet) drives secondary device display panel direction (the smart watch) and stays aligned; and (x) while interacting with mobile [handheld] device, the proposed technique will track how the user is interacting with mobile device, and accordingly if the proposed system identifies the mobile device interaction can be improved by making smartwatch also to participate in the interaction, accordingly the smartwatch display will rotate on the rail and auto-align with the mobile [handheld] device.

Some embodiments of the present invention may include one, or more, of the following operations, features, characteristics and/or advantages: (i) once the smartwatch display is auto aligned with mobile phone display, then both the smartwatch and mobile device will collaborate with each other and will distribute the contents, functions between the devices in such a way that effectiveness of interaction can be increased; (ii) while auto-aligning the smartwatch display with a mobile phone, the user is notified in the mobile device and the haptic notification in smartwatch; (iii) the user can cancel the notification to stop aligning the smartwatch; (iv) accordingly the proposed technique will consider the feed for self-learning; (v) while interacting with both the smartwatch and mobile phone, if the proposed technique identifies additional contents are to be displayed in smartwatch, then proposed system will be expanding the display of smartwatch by understanding the direction in which it has to display and so thar collaborative interaction effectiveness can be increased; (vi) upon detecting a stop command, the interaction with both smartwatch and mobile device, the proposed technique will dynamically reposition the smartwatch display in such a way that the user can only interact with smartwatch display [or the mobile device display instead, at the same time]; (vii) the user mobile usage style and smart watch usage pattern is analyzed for a timeseries data and accordingly recommends the appropriate time for synchronization, and suggests/notifies the user to keep devices nearby for data transfer; (viii) during the data transfer, if the user has to perform any activity then the said transfer might pause or stop based on the delta of mobile range to smartwatch, and then the said system performs the importance/criticality involved for user to synchronize the data; and (ix) accordingly provides recommendations to the user by displaying the time it takes for action to complete, or suggest an idle range for mobile to smartwatch so that transfer can continue.

Some embodiments of the present invention may include one, or more, of the following operations, features, characteristics and/or advantages: (i) in a first use case, the user is holding a mobile device in their hand, with a smartwatch as a [wirelessly] connected device to the mobile device (in this use case, the primary device is the mobile device and the secondary device is the smartwatch); (ii) the user was performing some activity and then wants to show the content to members who in front from the user; (iii) if the user rotates the mobile device forward toward the members, the smartwatch also rotates to a different angle viewable to the members in order to show the aligned content from connected devices; (iv) in a second use case, a user is using their tablet computing device as a primary device placed on their desk and a smartwatch is a secondary device connected with content on the tablet; (v) the user viewing direction of the tablet and smartwatch need not be at same angle in this scenario; (vi) as per earlier discussed features, the smartwatch dial has to adjust multiple times to ensure the display portion of the smartwatch is properly shown as per the eye view direction of the user whenever user view shifts to seeing watch display; (vii) while using the tablet, their hand position changes based on position of tablet angle; (viii) connected [primary] device display direction drives secondary device display panel to maintain alignment between primary and secondary device displays; (ix) in a third use case, a user is projecting some content from their laptop (such as a slide show) in a conference room; (x) the laptop is the primary device, and the user's smartwatch is the secondary device; (xi) the user prefers to see next slide content in their smartwatch; (xii) their eye direction might shift from projector screen, to the laptop screen, to the participants during the presentation; and (xiii) while the user presents, the smartwatch dial or display will be aligned to the connected primary device display, avoiding frequent rotation of dial (back and forth) to align with user eye direction.

Figure 6A:
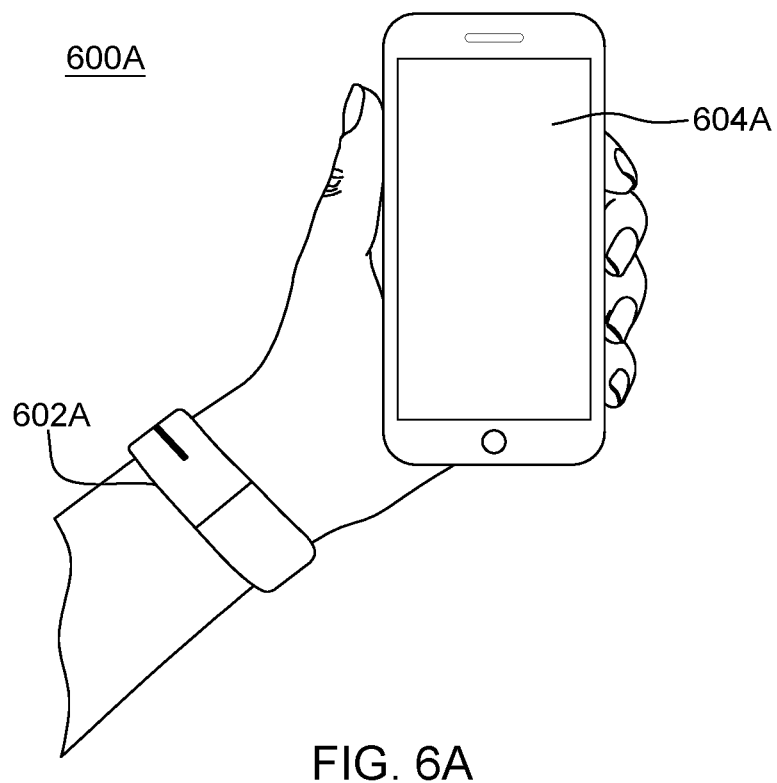
FIG. 6A is a screenshot view showing relative positions of a smartwatch and handheld mobile device prior to automatic alignment.
Figure 6B:
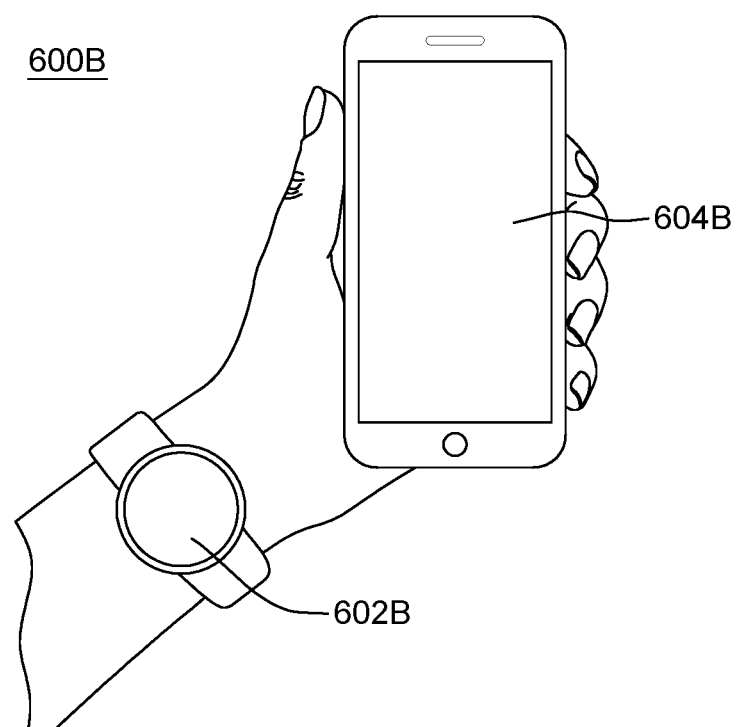
FIG. 6B is a screenshot view showing relative positions of a smartwatch and handheld mobile device after automatic alignment.

FIGS. 6A and 6B show how a smartwatch, according to embodiments of the present invention, is automatically aligned with a mobile phone display position so that the user can use both smartwatch and mobile phone for effective interaction. Screenshot 600A of FIG. 6A shows smartwatch 602A, worn on a user's left wrist, with the watch dial/face of the smartwatch located on the dorsal side of the user's wrist, facing opposite of the display of mobile phone 604A. Screenshot 600B of FIG. 6B shows the watch dial/face of smartwatch 602B rotated to alignment with mobile phone 604B, with both device's displays facing the same direction.

Some embodiments of the present invention may include one, or more, of the following operations, features, characteristics and/or advantages: (i) smartwatch and mobile device are paired so both the smartwatch and mobile device are communicating with each other; (ii) based on the mobility pattern of smartwatch and mobile device, the proposed identifies when both of the devices are in use; (iii) both the smartwatch and mobile device have proximity sensors so that the smartwatch and mobile phone can detect if both the devices are close by or not; (iv) both the smartwatch and mobile phone have accelerometer sensors and gyroscopic sensors; (v) historically both the smartwatch and mobile device will be identifying how the user is using both the devices together; (vi) while interacting with both the devices, user can manually align the smartwatch and interact with mobile device; (vii) the proposed technique identifies: (a) what types of interactions the user is performing, (b) what types of content the user is browsing such as text or images based on file type etc., and (c) what types of action the user is performing (cut or copy/paste or view/print etc.); (viii) in this case the proposed technique uses a smartwatch rail-based belt as enabling art; (ix) the smartwatch display can use the rail and rotate the position on the rail; (x) identifying how the user interacts with various contents, when certain types of contents are opened on each device, etc.; (xi) based on the historical interaction pattern with both the devices, identify the need of interaction with both mobile and smartwatch devices; (xii) mobile device will be identifying what types of interaction is being happening with mobile device, if the user opens multiple applications, if the user needs to toggle with different apps etc., (xiii) identifying the need of aligning the smartwatch with mobile device; (xiv) identifying the current alignment and display direction of the mobile device; (xv) identifying if the user is wearing smartwatch, and if the smartwatch is within the proximity of the mobile device; (xvi) sending the notification to smartwatch to perform auto aligning the display with the mobile device display; (xvii) smartwatch display will auto rotate and will rotate on the belt of the smartwatch to align with the mobile device; (xviii) the mobile and smartwatch will communicate to identify/confirm the aligned position with each other; (xix) identifying the contents which are to be shown in smartwatch; and (xx) once the collaborating interaction is completed, then smartwatch will return to the original position prior to alignment with the mobile device.

Some embodiments of the present invention may include one, or more, of the following operations, features, characteristics and/or advantages: (i) collaborative interaction pattern between smartwatch and mobile device (a primary and secondary device); (ii) predicting if the user will be interacting with both mobile device and smartwatch together and accordingly smartwatch display will dynamically auto align with respect to the mobile device display alignment; (iii)

while a user is interacting with mobile device, tracking how the user is interacting with mobile device and accordingly identifying when the mobile device interaction can be improved by making smartwatch also to participate in the interaction; (iv) accordingly smartwatch display will be rotating on the rail and will be auto-aligning with mobile device; (v) user is holding a mobile in his hand and smartwatch is connected device (Primary mobile and secondary smartwatch); (vi) user was doing some activity and then want to show the content to members who are facing in front of the user; (vii) when the user rotates the mobile device forward, the smartwatch also rotates to the required angle in order to show the aligned content from both connected devices in the same direction; (viii) tracking the user's interactions with the mobile device and rotating the smartwatch display on the rail for auto aligning with the mobile device; (ix) allowing the user to cancel notification to stop aligning the smartwatch; (x) considering feed for self-learning; (xi) identifying additional contents to be displayed in the smartwatch and expanding the display of the smartwatch by determining direction in which it to be displayed; and (xii) dynamically repositioning the smartwatch display to interact with the smartwatch display based upon detecting stop command.

Some embodiments of the present invention may include one, or more, of the following operations, features, characteristics and/or advantages: (i) smartwatch display is auto aligned with mobile phone display; (ii) both the smartwatch and mobile device will be collaborating with each other and will be distributing the contents and functions between both of the devices in such a way that effectiveness of interaction can be increased; (iii) while auto aligning smartwatch display with mobile phone, the user will be notified in the mobile device and the haptic notification in smartwatch; (iv) the user can cancel the notification to stop aligning the smartwatch, and accordingly consider the feed of user interaction (such as cancelling the auto alignment) for self-learning in the future to predict the user's cancellation of the auto alignment; (v) while a user is interacting with a mobile device, tracking how the user is interacting with the mobile device, and accordingly identifying when the mobile device interaction can be improved by making smartwatch also able to participate in the interaction; (vi) accordingly smartwatch display will rotate on the rail and auto align with the mobile device; (vii) for example, the user is using their tablet that is placed on a work desk and a smartwatch is secondary device connected with content on the tablet; (viii) the user viewing direction of tablet and smartwatch need not be at same angle in this scenario; (ix) while using the tablet, the user's hand position might keep changing based on position of tablet angle; (x) connected device display direction drives secondary device display panel direction and stays aligned; (xi) tracking the user interacting with the mobile device and rotating the smartwatch display on the rail for auto aligning with the mobile device; (xii) allowing the user to cancel notification to stop aligning the smartwatch; (xiii) considering feed for self-learning; (xiv) identifying additional contents to be displayed in the smartwatch and expanding the display of the smartwatch by understanding direction in which it to be displayed; and (xv) dynamically repositioning the smartwatch display to interact with the smartwatch display based upon detecting stop command.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) for use with a wrist-mounted display device having a display component magnetically attached to a band of magnetic material throughout a circumference of a wrist-strap, the CIM comprising:

receiving an orientation-usage information dataset indicative of recent user interactions with a first display device and orientation of the first display device relative to the wrist-mounted display device;

determining that the wrist-mounted display device should display content corresponding to the recent user interactions with the first display device based, at least in part, on the recent user interactions with the first display device; and repositioning the display component of the wrist-mounted display device from a first position on the band of magnetic material to a second position on the band of magnetic material based, at least in part, on the orientation-usage information dataset, wherein the second position is at a specific distance from the first position along the circumference of the wrist-strap.

2. The CIM of claim 1, wherein the first display device is a smartphone and the wrist-mounted display device is a smartwatch.

3. The CIM of claim 1, further comprising:
displaying, on the repositioned display component of the wrist-mounted display device, the content corresponding to the recent user interactions.

4. The CIM of claim 1, further comprising:
receiving a historical usage dataset corresponding to historical usage of the wrist-mounted display device and the first display device; and
training a machine learning model for determining when the wrist-mounted display device should display content corresponding to the recent user interactions with the first display device based, at least in part, on the historical usage dataset.

5. The CIM of claim 4, wherein the determination that the wrist-mounted display device should display content corresponding to the recent user interactions with the first display device is based, at least in part, on the trained machine learning model.

6. A computer program product (CPP) for use with a wrist-mounted display device having a display component magnetically attached to a band of magnetic material throughout a circumference of a wrist-strap, the CPP comprising:

one or more computer readable storage media, and program instructions collectively stored on the one or more computer readable storage media, the program instructions comprising:

program instructions to receive an orientation-usage information dataset indicative of recent user interactions with a first display device and orientation of the first display device relative to the wrist-mounted display device;

program instructions to determine that the wrist-mounted display device should display content corresponding to the recent user interactions with the first display device based, at least in part, on the recent user interactions with the first display device; and program instructions to reposition the display component of the wrist-mounted display device from a first position on the band of magnetic material to a second position on the band of magnetic material based, at least in part, on the orientation-usage information dataset, wherein the second position is at a specific distance from the first position along the circumference of the wrist-strap.

7. The CPP of claim 6, wherein the first display device is a smartphone and the wrist-mounted display device is a smartwatch.

8. The CPP of claim 6, wherein the program instructions collectively stored on the one or more computer readable storage media further comprises program instructions to:
display, on the repositioned display component of the wrist-mounted display device, the content corresponding to the recent user interactions.

9. The CPP of claim 6, wherein the program instructions collectively stored on the one or more computer readable storage media further comprises program instructions to:
receive a historical usage dataset corresponding to historical usage of the wrist-mounted display device and the first display device; and
train a machine learning model for determining when the wrist-mounted display device should display content corresponding to the recent user interactions with the first display device based, at least in part, on the historical usage dataset.

10. The CPP of claim 9, wherein the determination that the wrist-mounted display device should display content corresponding to the recent user interactions with the first display device is based, at least in part, on the trained machine learning model.

11. A display device assembly comprising:
a display face sub-assembly including a display screen defining a display plane;
a magnetic actuation sub-assembly;
a magnetic actuation control module; and
a wrist band structured and located for allowing the display device assembly to be worn on a human wrist;
wherein:
    the magnetic actuation sub-assembly is structured and connected to the display face sub-assembly;
    the magnetic actuation sub-assembly includes at least a first magnetically interactive hardware component, a second magnetically interactive hardware component and an adjustable magnet that can have its magnetic field adjusted in strength and/or polarity;
    the magnetic actuation control module is structured and/or programmed to control the adjustable magnet in a manner that causes the magnetic actuation sub-assembly to drive the display face sub-assembly to rotate with respect to each other about an axis at least substantially normal to the display plane; and
    the magnetic actuation control module is further structured and/or programmed so that a display on the display screen will appear to remain vertically aligned as the display device assembly is moved in an arbitrary manner through movements of a user's wrist.

12. The assembly of claim 11, wherein the magnetic actuation control module is further structured and/or programmed so that the display plane of the display screen of the display face sub-assembly will appear to remain aligned with a second display plane as the wrist band is moved in the arbitrary manner through the movements of the user's wrist, where the second display plane is defined by a display screen of a second display device.

13. The assembly of claim 12, wherein the second display device is a smartphone held in a human hand attached to the human wrist.

14. The assembly of claim 12, wherein:
the display screen of the display face sub-assembly includes two sub-display screens connected to a third rollable sub-display screen; and the magnetic actuation control module is further structured and/or programmed so that the two sub-display screens separate along their contiguous edges to expose at least a portion of the third rollable sub-display screen.

15. The assembly of claim 14, wherein the two sub-display screens and the third rollable sub-display screen are further structured and/or programmed so that the two sub-display screens and the third rollable sub-display screen combine to form one display screen.

* * * * *